(12) United States Patent
Hassler et al.

(10) Patent No.: US 11,997,323 B2
(45) Date of Patent: May 28, 2024

(54) CONTENT DELIVERY

(71) Applicant: Comcast Cable Communications, LLC, Philadelphia, PA (US)

(72) Inventors: Garey Hassler, Castle Pines, CO (US); Tedd Dawson, Littleton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/849,937

(22) Filed: Jun. 27, 2022

(65) Prior Publication Data

US 2023/0088885 A1 Mar. 23, 2023

Related U.S. Application Data

(63) Continuation of application No. 16/361,943, filed on Mar. 22, 2019, now Pat. No. 11,405,662.

(51) Int. Cl.
| | |
|---|---|
| *H04N 21/44* | (2011.01) |
| *H04N 21/231* | (2011.01) |
| *H04N 21/234* | (2011.01) |
| *H04N 21/438* | (2011.01) |
| *H04N 21/6332* | (2011.01) |
| *H04N 21/84* | (2011.01) |
| *H04N 21/845* | (2011.01) |

(52) U.S. Cl.
CPC . *H04N 21/23406* (2013.01); *H04N 21/23106* (2013.01); *H04N 21/23424* (2013.01); *H04N 21/44004* (2013.01); *H04N 21/44016* (2013.01)

(58) Field of Classification Search
CPC ....... H04N 21/23106; H04N 21/44016; H04N 21/44004; H04N 21/23424
See application file for complete search history.

(56) References Cited

U.S. PATENT DOCUMENTS

| | | | | |
|---|---|---|---|---|
| 6,985,188 | B1 * | 1/2006 | Hurst, Jr. | G06T 9/004 |
| | | | | 348/E5.002 |
| 8,531,612 | B1 * | 9/2013 | Shintani | H04N 21/414 |
| | | | | 348/730 |
| 10,114,689 | B1 * | 10/2018 | Yang | G06F 11/0751 |
| 2003/0091000 | A1 | 5/2003 | Chu et al. | |
| 2006/0109385 | A1 * | 5/2006 | Wakako | H04N 21/4383 |
| | | | | 348/731 |
| 2013/0347123 | A1 | 12/2013 | Zhang et al. | |
| 2014/0150019 | A1 * | 5/2014 | Ma | H04N 21/458 |
| | | | | 725/34 |
| 2014/0189052 | A1 | 7/2014 | Gholmieh et al. | |
| 2015/0249853 | A1 | 9/2015 | Khare | |
| 2016/0337672 | A1 | 11/2016 | Lee et al. | |
| 2018/0376197 | A1 | 12/2018 | Gonzalez | |
| 2019/0208263 | A1 * | 7/2019 | Chamberlin | H04N 21/2401 |
| 2020/0037008 | A1 | 1/2020 | Hassler | |
| 2020/0111371 | A1 * | 4/2020 | Roger | G08G 5/003 |
| 2020/0128293 | A1 * | 4/2020 | Mittal | H04N 21/845 |

* cited by examiner

*Primary Examiner* — Hsiungfei Peng
(74) *Attorney, Agent, or Firm* — Banner & Witcoff, Ltd.

(57) ABSTRACT

Systems, apparatuses, and methods are described for a user device controlling a playback buffer to reduce latency in a service change.

23 Claims, 7 Drawing Sheets

CONTENT DELIVERY

CROSS-REFERENCE TO RELATED APPLICATIONS

This application claims priority to and is a continuation of U.S. application Ser. No. 16/361,943, filed Mar. 22, 2019, the disclosure of which is hereby incorporated by reference in its entirety.

BACKGROUND

In a content delivery network, a streaming media player (e.g., a user device) may download and display content to a user. To help ensure a smooth playback experience, the media player may maintain a minimum amount of buffered content that is ahead of a current playback position, such that short disruptions/delays in downloading need not interrupt the playback. The media player may comprise a playback buffer to store that minimum amount (e.g., the buffer may store the next 6 seconds of content to be played back). When the media player changes from a current service to a new service, e.g., changing a current channel to a new channel, there is often a delay as the media player tears down its playback buffer, re-initializes the playback buffer for the new service, and downloads the minimum amount of the new service before playback of the new service begins. This delay can be disruptive to the user, and is addressed by the present disclosure.

SUMMARY

The following presents a simplified summary of certain features. The summary is not an extensive overview and is not intended to identify key or critical elements.

Systems, apparatuses, and methods are described for controlling the playback buffer associated with a media player to reduce delay, for example, when switching to a new service or content. In the event of a service change from an old service to a new service, e.g., changing from a current channel to a new channel, the playback buffer may be maintained, instead of being re-initialized, and the media player may continue to play content from the playback buffer while the media player downloads new content from the new service. However, to avoid playing buffered content for the old service (which the user no longer wishes to view), some or all of the unplayed content in the playback buffer may be overwritten with service change content (e.g., slate content), which may indicate that a new service is being obtained, so that although the media player is continuing to playback content in the playback buffer, it will play back the service change content instead of content from the old service. The service change content may comprise black or blank content or advertisement content, and presentation of the service change content may indicate that the service change is being processed.

The playback buffer need not be entirely overwritten in this process. The amount of overwriting in the playback buffer content may be based on a prediction of when content, for the new service, will be downloaded and ready for placement in the playback buffer. During playback prior to a service change request, the media player may periodically determine, based on historical data, an amount of time that would be needed to begin receiving content from a new service if a service change were requested at the current time. That amount of time may be used to determine an estimated insertion point, in the playback buffer, where content of a new service would be inserted if a service change were received at the current time. After the media player receives a service change request, the media player may insert the service change content between a currently-rendered segment of the current service and the most recent estimated insertion point in the playback buffer, and may assume that new content for the new service will be added to the playback buffer by the time playback reaches the estimated insertion point. The inserted service change content may allow the media player to continue playback of the content stored in the playback buffer without interruption caused by teardown and reinitialization. The media player may insert, beginning at the estimated insertion point, a first segment of the new service, and append other segments to the inserted first segment as the new segments are received. As such, the media player may perform a continuous playback without re-initializing the playback buffer, and the overall time between the service change request and presentation of the new service may be reduced.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
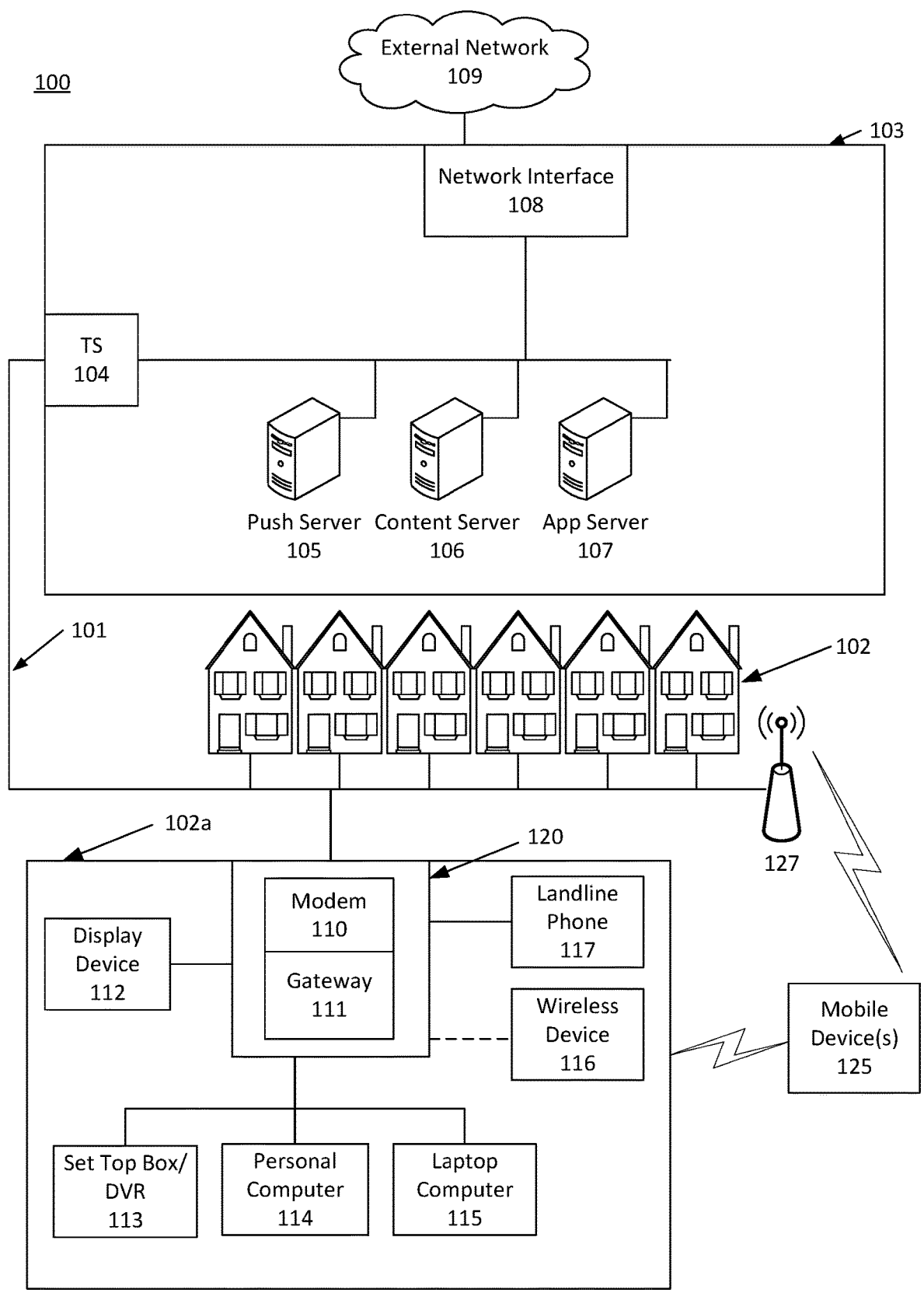
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

The communication links 101 may originate from the local office 103 and may be split to exchange information signals with the various premises 102. The communication links 101 may include components not shown, such as splitters, filters, amplifiers, etc. to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS). The interface 104 may be a cable modem termination system (CMTS), which may be a computing device configured to manage communications between devices on the network of the communication links 101 and backend devices such as servers 105-107. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks 109. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, additional push, content, and/or application servers, and/or other types of servers.

Content may include video content and audio content. Video content may comprise information displayed (or displayable) to a user in the form of one or more images. Video content may have associated the audio content, e.g., information presented (or presentable) to a user in audio form. Video content may be communicated or stored in the form of data. Video content data providing a digital representation of a particular video content may be created using any of various encoding types. Such encoding types include, but are not limited to, compression according to a Motion Picture Experts Group (MPEG) standard (e.g., MPEG-2), compression according to the ITU-T H.264 (ISO/IEC MPEG-4) advanced video coding (AVC) standard, High Efficiency Video Coding (HEVC) standard (e.g., H.265 and MPEG-H Part 2), etc. Before the encoded content can be rendered for display on a display screen associated with a user device, the encoded content needs to be decrypted. The encoding and/or decrypting may be realized by a video/audio codec. The video/audio codec may be computing device(s) or computing program(s) for encoding and/or decrypting the video/audio content. There may be different types of the video/audio codec for each encoding type.

In video content encoded using either MPEG-2, AVC, or HEVC, the video may be divided into multiple video segments, e.g., video data chunks each having, for example, a few seconds duration. Each segment may be encoded at multiple different bitrates such that different resolution/quality levels of each segment may be available for user devices (which will be discussed below) to download. The system may send a manifest of the video content to the user devices. The manifest may list segment identifications (IDs), an access location (e.g., network address, Internet address, uniform resource locator (URL), etc.) of each segment, and other parameters of each segment of the video. The manifest may also include information indicating a video codec used for decrypting the video content, and an audio codec used for decrypting the audio content associated with the video content. The manifest may also include information indicating DRM associated with the video content and/or with each segment. The manifest may be a video stream description file that describes any characteristic of the video stream.

MPEG-2, AVC, or HEVC encoding may use motion vector-based compression to efficiently represent the stream of image frames. Using this compression, each frame is categorized as either an independent frame or a dependent frame. Independent frames are represented in the stream by data that is sufficient to generate the frame's complete image without knowledge about neighboring frames in the stream, similar to how a still image picture may be represented. The first frame after a scene change is typically represented using an independent frame.

In the MPEG-2, AVC, or HEVC standard, independent frames are referred to as Intra-coded picture frames (I-frames), while dependent frames are referred to as either Predicted picture frames (P-frames), or a Bi-directional predicted picture frames (B-frames). A P-frame is dependent on a prior frame in the stream, while a B-frame is dependent on both a prior and a subsequent frame in the stream.

Although shown separately, the push server 105, the content server 106, the application server 107, and/or other server(s) may be combined. The servers 105, 106, and 107, and/or other servers, may be computing devices and may include memory storing data and also storing computer executable instructions that, when executed by one or more processors, cause the server(s) to perform steps described herein.

An example premises 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), a twisted-pair telephone modem, a cellular telephone transceiver, a satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102*a*, to communicate with the local office 103 and other devices beyond the local office 103. The gateway interface device 111 may comprise a set-top box (STB), digital video recorder (DVR), a digital transport adapter (DTA), computer server, and/or any other desired computing device. The gateway interface device 111 may also include local network interfaces to provide communication signals to requesting entities/devices in the premises 102*a*, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premises 102*a* may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more of the mobile devices 125, which may be on- or off-premises.

The mobile devices 125 may communicate with a local office 103. The mobile devices 125 may be cell phones, smartphones, tablets (e.g., with cellular transceivers), laptops (e.g., communicatively coupled to cellular transceivers), wearable devices (e.g., smart watches, electronic eyeglasses, etc.), or any other mobile computing devices. The mobile devices 125 may store, output, and/or otherwise use assets. An asset may be a video, a game, one or more images, software, audio, text, webpage(s), and/or other content. Mobile devices 125 may include Wi-Fi transceivers, cellular transceivers, satellite transceivers, and/or global positioning system (GPS) components.

The display devices 112, the additional STBs or DVRs 113, the personal computers 114, the laptop computers 115, the wireless devices 116, and the mobile devices 125 discussed above may be examples of a user device that controls its playback buffer as described in connection with FIGS. 3A-4B.

Figure 2:
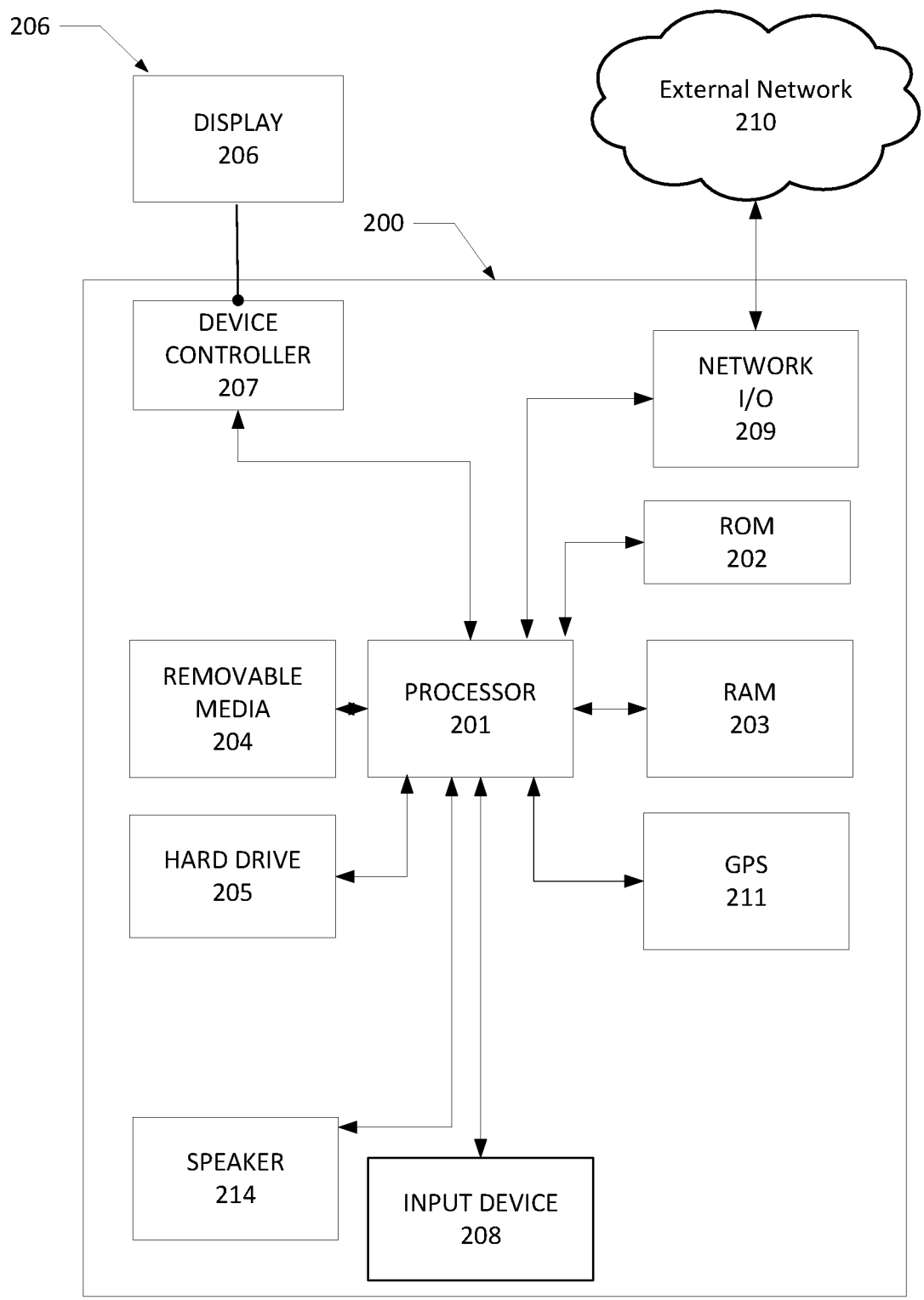
FIG. 2 shows hardware elements of a computing device.

FIG. 2 shows hardware elements of a computing device 200 that may be used to implement any of the computing devices discussed herein (e.g., a user device controlling its playback buffer). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the computing device 200 may include a location-detecting device, such as a global positioning system (GPS) microprocessor 211, which can be configured to receive and process global positioning signals and determine, with possible assistance from an external server and antenna, a geographic global position of the computing device 200. The computing device 200 may include Bluetooth circuitry (not shown) configured to receive and process Bluetooth positioning signals and determine an indoor location (e.g., a related location within a premises) of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a playback buffer.

When a user device consumes service content (e.g., video content of a channel), the user device may download video segments and decrypt the video segments, and may temporarily store the decrypted video segments in a playback buffer. The user device may read the decrypted video segments from the playback buffer and output, for display, the decrypted video segments on a display screen associated with the user device. The user device may utilize a video/audio player application to download, decrypt, store, and output the service content. The user device may, in connection with changing a service (e.g., changing a channel), re-initialize the playback buffer filled with content of the current service and re-fill the re-initialized playback buffer with content of the new service. A re-initialized playback buffer may require a minimum amount of content (e.g., 6 seconds of content or three 2-second video segments) in order to allow the user device to re-start rendering content stored in the playback buffer. The minimum amount of content may be a minimum playback threshold associated with the playback buffer. The reinitialization of the playback buffer may include clearing all the old content previously stored in the playback buffer and/or replacing all the old content data previously stored in the playback buffer with zeros. For the user device to start playback of the content of the new service, the user device may need to re-fill the re-initiated playback buffer with the minimum amount of content (e.g., 6 seconds of content) of the new service. Re-initializing and re-filling the playback buffer with the minimum amount of content may introduce latency the "tune time," i.e., a time interval between a point time at which a request for changing to the new service is made and a point time at which the user device starts playback of the content of the new service.

To reduce the latency of the tune time for a channel change, a user device may omit reinitialization of the playback buffer. Rather, in connection with a service change request, the user device may determine an estimated insertion point from which the content of the new service should start to be inserted in the playback buffer and replace old service content, which has not been rendered, stored prior to the estimated insertion point with service change content. Before some content of the new service is stored in the playback buffer and is ready for playback, the user device may render the service change content to indicate that the service change is in progress. Some content of the new service may be stored in the playback buffer and be ready for playback before the user device renders all content stored prior to the estimated insertion point. As such, the playback of the content of the new service will be not interrupted. The user device may start continuous playback of the content of the new service from the estimated insertion point without re-initializing the playback buffer and re-filling the re-initialized playback buffer with the content of the new service. As a result, the tune time may be reduced. These features will be further described with reference to FIGS. 3A through 4B, described below.

FIGS. 3A-3E show an example of a playback buffer that is controlled by a user device during a service change.

The playback buffer may be a circular buffer, in which new content is continuously obtained. After content stored in the playback buffer reaches a size/time content limit, the playback buffer may start circular buffering, e.g., removing the oldest content from the buffer and writing the newest content into the buffer. The playback buffer may accommodate any size/time limit of content (e.g., one (1) Gigabyte). For simplicity, the playback buffer as shown in FIGS. 3A-3E has a storage size limit for accommodating five (5) content segments. The playback buffer may include five (5) buffer slots 330, 332, 334, 336, and 338, and each buffer slot may accommodate one (1) content segment (e.g., a video segment or a service change segment, which will be described below). A video segment may be a content segment including video content of a service (e.g., a channel), or a service change segment (e.g., a slate segment) comprising content indicating a service change (e.g., a blank slate, a screen stating "download in progress", etc.). In this example, each of these content segments may be a 2-second content segment, and each buffer slot may accommodate a 2-second content segment. In some examples, the content segment stored in a buffer slot may be a content segment having any other time period (e.g., 0.1 second, 0.5 second, 1 second, 5 seconds, 10 seconds, or etc.) of content. Content segments including different time periods of content may have different sizes of content data, respectively. In some examples that implement MPEG-2, AVC, or HEVC encoding, if content segments having a same content length are encoded at different bitrates, respectively, the content segments may have different sizes of content data, respectively. The size of a buffer slot may vary depending on the size of content data of the content segment that is stored in the buffer slot.

Figure 3A:
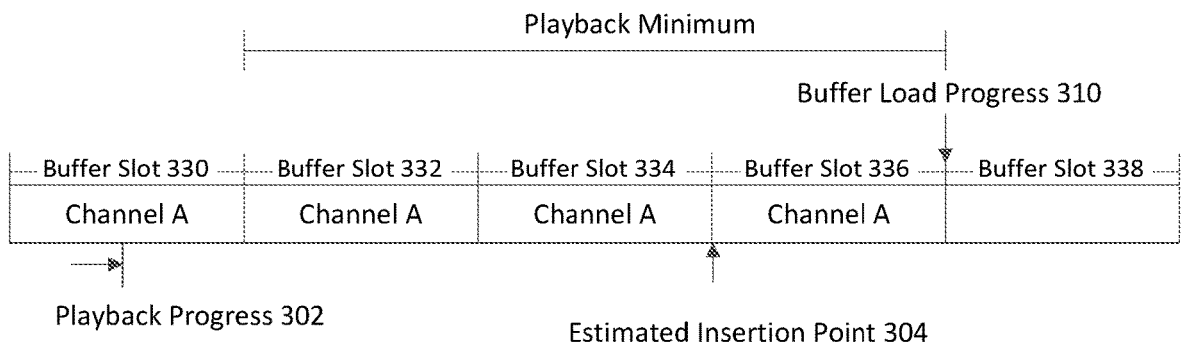
FIGS. 3A-3E show an example of a playback buffer.

FIG. 3A shows an example playback buffer when a user is watching a current service (e.g., Channel A) on a display screen associated with a user device. The display screen may be part of the user device or may be a separate device with which the user device communicates.

The user device may render content of the current service by, e.g., processing content data, in the playback buffer, corresponding to the portion of the playback progress 302, to generate signals to cause the associated display screen to present the corresponding portion of the content. The user device may require the playback buffer have a minimum number (e.g., a playback minimum including three (3) 2-second video segments) such that the user device may use adaptive bitrate (ABR) calculations (which will be discussed later) to determine which resolution/quality, among all available resolutions/qualities, of additional content segments should be chosen when downloading the additional content segments. Also, in the cases where no service change occurs, when the content stored in the playback buffer does not satisfy the playback minimum (e.g., the number of content segments stored in the playback buffer is less than the number of content segments included in the playback minimum), the user device may download additional content segments as fast as possible (e.g., by downloading content segments having resolution/quality lower than the resolution/quality determined by the latest ABR calculations) to satisfy the playback minimum again. The user device may continue to render the content stored in the playback buffer until the playback buffer does not store any content for the user device to render or until the playback buffer does not store enough content data for the user device to compute a P-Frame and/or a B-Frame. The playback minimum may be calculated from the end of the currently-rendered segment (e.g., the Channel A segment stored in the buffer slot 330, FIG. 3A). Even though a playback minimum including three 2-second video segments is used in this example and the following examples, it should be understood that the number of content segments included in the playback minimum may vary depending upon capability of the user device, and/or encoding/compression types of video content. For example, the playback minimum may include four or even five 2-second video segments. In some cases, the number of content segments included in the playback minimum may also depend on the playback duration of the content segment. For example, if the content segment is a 6-second video segment or a 10-second video segment, the playback minimum may include only one or two video segments. But, delivering linear video services with larger segments (e.g., 6-second video segments or 10-second video segments) may introduce other implications such as additional delays behind the live point for, e.g., live sport events. Compared to delivering video content with larger segments, delivering video content with 2-second segments may reduce such delays and balance the video delivery.

When the user is watching Channel A on the display screen associated with the user device, the user device outputs, for display, the decrypted content of Channel A that is temporarily stored in the playback buffer. At the same time, the user device may continue to download and decrypt additional content of Channel A and to store the decrypted additional content of Channel A into the playback buffer. The storing the decrypted content may comprise appending the decrypted content to the last stored decrypted content.

The playback progress 302 indicates a current playback location, in the playback buffer, at which the user device is reading and rendering content for display to the user. In the example of FIG. 3A, the playback progress 302 points to an intermediate portion of a video segment (e.g., the Channel A segment stored in the buffer slot 330). This indicates that the user device is outputting, for display, an intermediate portion of the Channel A segment stored in the buffer slot 330 on the associated display screen. The buffer load progress 310 indicates the last complete segment that has been successfully received, decoded/decrypted, and stored into the buffer.

The user device may use ABR calculations to calculate, based on the current network condition and resolutions/qualities of some content segments that have been downloaded and stored in the playback buffer, which resolution/quality, among all available resolutions/qualities, of an additional content segment should be chosen when downloading the additional content segment. The ABR calculations may allow the time for downloading and inserting a content segment to be less than the content time length of the content segment. For example, the ABR calculations may keep the time for downloading and inserting a 2-second content segment less than 2 seconds.

As shown in FIG. 3A, the playback buffer stores three (3) 2-second video segments (e.g., the Channel A segments stored in the buffer slots 332, 334, and 336) ahead of the current playback progress 302, and satisfies the playback minimum. The user device may use the ABR calculations to determine which resolution/quality, among all available resolutions/qualities, of an additional content segment should be chosen when downloading the additional content segment. For example, if no network congestion occurs, the user device may determine, by using the ABR calculations, that a resolution/quality same as an average resolution/quality of the last 3 downloaded content segments may be chosen when downloading the additional content segment. If network congestion occurs (e.g., network latency increasing by a predetermined amount, network data transmitting rate falling below a predetermined threshold), the user device may determine, by using the ABR calculations, that a lower (compared to the average resolution/quality of the last 3 downloaded content segments) resolution/quality may be chosen for downloading the additional content segment. In some cases, due to network congestion, the buffer load progress 310 may no longer keep up with the playback progress 302 such that the playback buffer may fall below the playback minimum (e.g., the number of un-rendered Channel A segments stored between the end of Channel A segment stored in the buffer slot 330 and the buffer load progress 310 being less than 3), and/or the user device may determine that the time for downloading and inserting the additional content segment is longer than the content time length of the additional content segment. In these cases, the user device may continue playback of content of Channel A segments stored in the playback buffer, and may download additional Channel A segments as fast as the user device can (e.g., downloading additional Channel A segments with lower resolutions/qualities, among all available resolutions/qualities). In the case where the user device has determined to download the lowest resolution/quality of an additional Channel A segment but still cannot download and store the additional Channel A segment in the playback buffer before the user device has rendered all the content stored in the playback buffer, the user device may stop playback of the content of Channel A, or pause playback until the playback buffer has downloaded enough to fulfill the playback minimum.

The user device may continuously maintain the playback minimum by requesting subsequent segments indicated in the manifest. In the example of FIG. 3A, the playback buffer has stored four Channel A video segments (stored in the buffer slots 330, 332, 334, and 336, respectively) that are indicated in the manifest of Channel A. The Channel A segment stored in the buffer slot 336 is the most recently stored video segment in the playback buffer, and the buffer load progress 310 points to the end of the Channel A segment stored in the buffer slot 336. The term "end" refers to the right end of a segment. In some cases in which the user device is in the process of adding a new video segment into the playback buffer, the buffer load progress 310 may point to an intermediate portion of a video segment.

As shown in FIG. 3A, the buffer slot 338 is empty, and this indicates that the user device has not filled the buffer slot 338 with a video segment of the currently-watched Channel A. The buffer slot 338 may contain no content, and the user device may write a new decrypted segment into the empty buffer slot 338. Or, the buffer slot 338 may contain previously-stored old content (e.g., content of a prior channel that was previously consumed by the user device), zeros, or black/blank content, and the user device may overwrite content stored in the buffer slot 338 with a new decrypted segment at the buffer slot 338. If no service change occurs, the user device may use the ABR calculations to determine, based on the current network condition and resolutions/qualities of the Channel A segments stored in buffer slots 332, 334, and 336, a proper resolution/quality for a new Channel A segment, and may download the new Channel A segment with the calculated resolution/quality in the buffer slot 338.

The user device may determine an estimated insertion point 304 periodically (e.g., every one second, every 10 seconds, every 1 minute, etc.). The estimated insertion point 304 may predict, if the user device receives a service change command (e.g., a command for changing Channel A to Channel B) at this moment (e.g., a current time) and playback were to continue at the current rate of playback, where the playback progress 302 will be. Since that predicted playback progress is unlikely to be precisely at a boundary of a buffer slot, the estimated insertion point 304 may be chosen as the nearest buffer slot boundary to the predicted playback progress (nearest buffer slot preceding the predicted playback point, or nearest buffer slot following the predicted playback point). Additionally or alternatively, the user device may determine the estimated insertion point 304 on demand. For example, the user device may determine the estimated insertion point 304 after the user device actually receives a service change command.

The user device may determine the estimated insertion point 304 based on historical data and/or the ABR calculations. By using the historical data, the user device may predict how quickly the user device will be able to retrieve the first segment of a new channel. This prediction may differ depending on a variety of factors. For example, the prediction may be based on time of day, and the user device may keep a record of previous channel changes, and note the tune time that was needed for previous channel changes made at the same or similar time (e.g., channel changes made on Mondays at 2 pm usually take 1.5 seconds to process and receive the new channel's first segment, so it is predicted that the new channel's next segment will be received in 1.5 seconds). By using the ABR calculations, the user device may calculate, based on the current network condition and resolutions/qualities of the current service segments stored in the playback buffer, a proper resolution/quality for an additional current service segment to be downloaded. Based on the calculated resolution/quality, the user device may estimate the downloading time for the additional current service segment. The user device may assume that, if a service change command (change from the current service to a new service) is received at the current time, the user device would download a new service segment having a resolution/quality same as the calculated resolution/quality for the additional current service segment, and may assume that the user device may spend a time, which is same as the estimated downloading time for downloading the additional current service segment, to get a new service segment. As will be discussed later, the user device may need to spend additional time to download a manifest/DRM license for a new service and to initialize a new video/audio codec before a first new service segment can be downloaded. The user device may determine the additional time based on historical data. The user device may determine the estimated insertion point 304 based on the additional time and the estimated downloading time. For example, the user device may determine that downloading a new service segment having a resolution/quality same as the resolution/quality calculated for an additional Channel A segment to be downloaded and downloading the manifest/DRM license and initializing the new video/audio codec can be done in 1.5 seconds. The user device may then determine that the estimated insertion point 304 is 1.5 seconds after the end of the currently-rendered Channel A segment stored in the buffer slot 330. In some cases, it may take more time (e.g., 3 seconds) to download the new channel's first segment. In these cases, after the first three segments of the new channel have been downloaded and the playback minimum has been satisfied, the user device may use the ABR calculations to adjust the resolution/quality for an additional new service segment so that the time for downloading of the additional new service segment is shorter than the playback duration (i.e., 2 seconds) of the 2-second segment.

In the example of FIG. 3A, the historical data may show that it usually takes 3.6 seconds, at the current time of day and under the current network conditions, for a new channel segment to be received. Assuming a normal (e.g., not fast-forwarded) playback rate, the current playback progress 302 (which is in the middle of slot 330) may be 3.6 seconds further along (e.g., somewhere in slot 334), if the buffer slots are assumed to hold 2 seconds of content. The estimated insertion point 304 may be selected to be the nearest buffer slot boundary after that estimated playback point. In the FIG. 3A example, the estimated insertion point 304 is shown to be the boundary between buffer slots 334 and 336. If the user device receives a channel change command at the current time, the content of the new channel will be inserted at the estimated insertion point 304, and service change content (e.g., slate content) will be inserted between the current playback progress point 302 (or the end of the buffer slot comprising that playback progress point 302) and the estimated insertion point 304. By using the estimated insertion point 304, the system may efficiently use the playback buffer while minimizing overwriting by the service change content.

The historical data may include data associated with time spent on a variety of actions taken during previous service changes and/or service content downloads. For example, the historical data may include service change time spent on previous service changes, new service DRM license downloading time spent on previous downloads of new service DRMs, manifest downloading time spent on previous downloads of manifests of services, first new service segment downloading time spent on previous downloads of the first segment of a new service, segment appending time spent on previous appendances of subsequent segments (following the first segment) of a new service, and etc. Historical data may also include data associated with average time spent on the variety of actions, e.g., average service change time, average manifest downloading time, average new service DRM license downloading time, average first new service segment downloading time, average segment appending time, and etc.

The historical data may be stored in a local memory of the user device. Alternatively or additionally, the historical data may be stored in a memory of a remote server such that the historical data may be shared between multiple user devices that have substantially same computing capabilities and/or that may operate under similar conditions.

The historical data may be updated frequently. For example, data associated with the new service change time or the average new service change time may be updated every time the user device starts playback of a new service after receiving a service change command. Updating the historical data may improve accuracy of prediction of the estimated insertion point because, e.g., the most recent network condition may be taken into account when predicting the estimated insertion point.

Figure 3B:
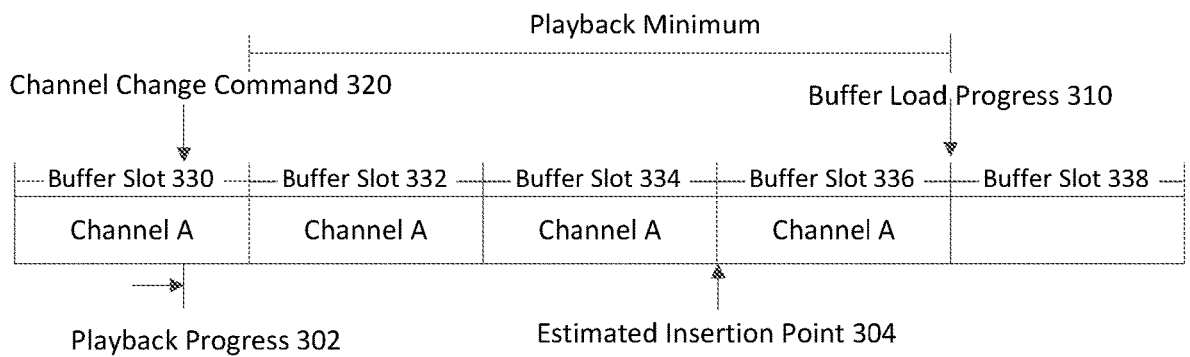

After a time duration (e.g., 0.5 second), the user device may receive a service change command. FIG. 3B shows the example playback buffer when the user device receives a channel change command (e.g., the channel change command 320) for changing from Channel A to Channel B.

In the example of FIG. 3B, at the moment when the user device receives the channel change command 320, compared to FIG. 3A, the user device may be rendering a later part (e.g., 0.5 second later) of the Channel A segment stored in the buffer slot 330. Thus, in FIG. 3B, the playback progress 302 may point to a later part of the Channel A segment stored in the buffer slot 330, compared to FIG. 3A.

In the example of FIG. 3B, the buffer load progress 310 remains the same as in FIG. 3A with an assumption that, during the 0.5 second time duration counting from FIG. 3A, the user device does not store a new video segment of Channel A into the playback buffer.

In the example of FIG. 3B, the estimated insertion point 304 may remain the same as in FIG. 3A because, although the playback progress 302 is predicted to be 0.5 second later than in FIG. 3A, the nearest buffer slot boundary following that predicted playback progress is still the boundary between buffer slots 334 and 336.

Figure 3C:
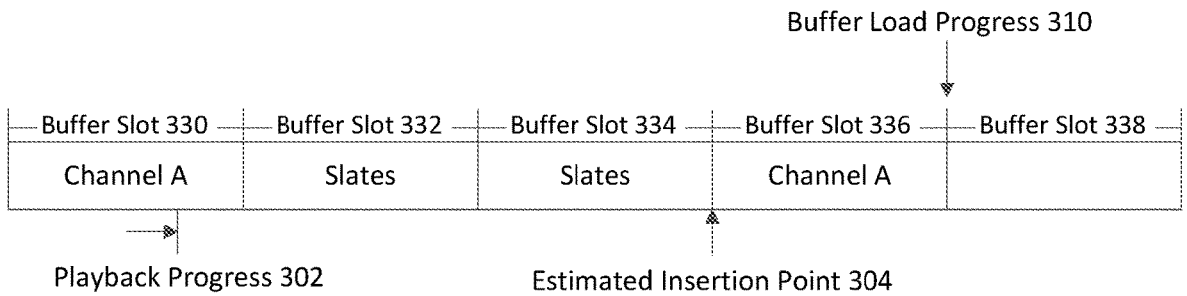

After the user device receives the service change command 320, the user device may insert slate segments to indicate that the service change is being processed, and to provide some content for the user device to render. As the playback buffer stores and provides some content for the user device to render before the content of the new service is downloaded and is ready for playback, the user device may continuously playback what is stored in the playback buffer without interruption. The user device may start downloading the manifest of the new service. Also, the user device may update, as needed, the estimated insertion point based on the downloading of the manifest of the new service. In some cases, the user device may perform downloading the manifest and inserting the slate segments in parallel. FIG. 3C shows the example playback buffer when the user device inserts the slate segments, downloads the manifest of the new service (e.g., Channel B), and updates, as needed, the estimated insertion point 304.

The user device may pre-store the slate segments in a local memory, and may copy the pre-stored slate segments from the local memory into the playback buffer. The user device may start inserting the slate segments immediately after the user device receives the service change command and the insertion of the slate segments does not take significant time (e.g., less than 0.01 second). The playback progress 302 does not change significantly compared to FIG. 3B.

Alternatively or additionally, the slate segments may be pre-stored in one or more external devices (e.g., a cable modem, a gateway, or an edge cache). Before the user device can copy the retrieved slate segments into the playback buffer, the user device may need to retrieve the slate segments from the external devices. It may take more time (e.g., 0.5 second) for the user device to start inserting the slate segments after the user device receives the service change command. The playback progress 302 in FIG. 3C may advance for some time (e.g., 0.5 second) compared to FIG. 3B.

In the example of FIG. 3C, the buffer load progress 310 remains the same as in FIG. 3B because the user device no longer downloads video segments of Channel A due to the receipt of the channel change command 320, and also because the user device has not downloaded a video segment of Channel B yet.

As discussed above, the slate segments may be black or blank content segments, may be advertisement content segments, or may be other types of content segments. The slate segments may contain any length (e.g., 0.1 second, 0.5 second, 1 second, 2 second, or etc.) of black or blank content or advertisement (or other) content. A slate segment may contain even less content, e.g., containing only a single I-Frame of black or blank screen. A slate segment may comprise an I-Frame of black or blank screen repeated a plurality of times to achieve a comparable frame rate. For example, in the case of 24 fps (frame per second), while the user device is in process of downloading the first segment of a new service, the user device may copy an I-Frame of black or blank screen 24 times into the playback buffer to cover a one-second of content playback. The advertisement content may contain data associated with one or more of the service provider (e.g., a logo of cable/satellite company providing cable service to the user), the manufacturer of the user device (e.g., a logo of the manufacturer), a channel logo of the new service (e.g., Channel B), or anything that the service provider or the manufacturer would like to advertise. When the user device performs playback of a slate segment, the user may see black or blank content or advertisement (or other) content on the display screen associated with the user device.

The user device may insert the slate segments immediately after the currently-rendered video segment and prior to the estimated insertion point 304, so that the user may be given some indication that the channel change is in process when the user sees the slate content. As shown in FIG. 3C, the user device may start inserting the first slate segment by replacing the Channel A video segment in the buffer slot 332, which is adjacent to the Channel A segment stored in the buffer slot 330 that is being currently rendered, with a slate segment. As the estimated insertion point 304 predicts that the content of Channel B will likely be inserted after the estimated insertion point 304, the user device may determine to insert the slate segments prior to the estimated insertion point 304. As shown in FIG. 3C, the user device may insert slate segments by replacing the Channel A segments stored in the buffer slots 332, 334 with the slate segments. The user device may need not to replace the Channel A segment stored in the buffer slot 336 with a slate segment because the Channel segment stored in the buffer slot 336 is predicted to be replaced by a segment of Channel B before the playback progress 302 reaches the estimated insertion point 304. The user device may determine the number of the slate segments based on the interval between the end of the video segment being rendered and the estimated insertion point, as well as the content length of a slate segment. For example, if the interval is four (4) seconds and the content length of a slate segment is two (2) seconds, the user device may determine that two (2) slate segments will be inserted. As another example, if the interval is four (4) seconds and the content length of a slate segment is one (1) second, the user device may determine that four (4) slate segments will be inserted.

In some cases, before the user device downloads the first segment of Channel B in the playback buffer, the user device may continue to insert one slate segment (e.g., a slate segment having any content size, for example, a slate segment including only a single I-Frame of black or blank screen) at a time to fill up the gap between the currently-rendered Channel A segment and the first segment of Channel B.

As discussed above, in the examples of MPEG-2, AVC, or HEVC, each video segment may be encoded at different bitrates such that different resolution/quality levels of each segment may be available for user devices to download. If the user device determines that the network condition does not change, the user device may require downloading a new video segment having the same quality as the previously downloaded video segment. So, the user device may select, for insertion, slate segments having the resolution/quality that is substantially same as the resolution/quality of the currently-rendered service (e.g., Channel A). For example, the slate segment stored in the buffer slot 332 may have a same resolution/quality as that of the Channel A segment stored in the buffer slot 330, e.g., the I-frames of the slate segment stored in the buffer slot 332 may have the same resolution/quality as the I-frames of the Channel A segment stored in the buffer slot 330.

The user device may pre-store multiple resolution/quality versions of slate segments in its local memory. The user device may select, for insertion and from those pre-stored segments, a pre-stored resolution/quality version that is closest to the resolution/quality of the Channel A segment stored in the buffer slot 330.

Alternatively, the user device may generate multiple resolution/quality versions of slate segments after receiving a service change command. In these cases, the user device may generate slate segments that have a resolution/quality same or substantially same as the resolution/quality of the Channel A segment stored in the buffer slot 330.

The user device may insert slate segments into the playback buffer by overwriting or replacing video segments of Channel A with slate segments. In the example of FIG. 3C, compared to FIG. 3B, the Channel A segments stored in the buffer slots 332 and 334 are replaced by slate segments.

The slate segments may be free from DRM and may not be subject to copyright restriction. Also, the slate segments may be ready for playback without need of being decrypted or decompressed. The user device may only need a very short time (e.g., less than 0.01 second) to insert the slate segments into the playback buffer.

The estimated insertion point 304 may point to any location, in the playback buffer, which is after the playback progress 302. The system may use the estimated insertion point 304 to determine how many slate segments are needed to show the user that the channel change is in process before the content of Channel B is inserted into the buffer.

In the example of FIG. 3C, the system may determine to replace Channel A segments stored in the buffer slots 332 and 334 with slate segments up to the estimated insertion point 304, and may retain the Channel A segment stored in the buffer slot 336 because the Channel A segment stored in the buffer slot 336 is expected to be replaced by a video segment of Channel B before the playback progress 302 reaches the estimated insertion point 304.

By using the estimated insertion point, the user device may manage the playback buffer by precisely determining a proper number of slate segments to be inserted in the playback buffer without wasting processing time by adding excessive slate segments, and may prevent the user device from inserting less slate segments than necessary.

The user device may start downloading the manifest of Channel B. The manifest of Channel B may be stored in a remote server (e.g., an original content source). The user device may download and retrieve the manifest of Channel B from the remote server based on its address. It may take some time for the user device to download/retrieve the manifest of Channel B from the remote server. In some cases, a different user device connected to a same edge cache as the user device may have retrieved the manifest of Channel B from the original content source, and the edge cache may have stored the manifest of Channel B. To further reduce the latency of the tune time, the user device may retrieve the manifest of Channel B from the edge cache. Based on the downloading of the manifest of Channel B, the user device may determine whether the downloading of the manifest of Channel B impacts where in the playback buffer the content of Channel B should start to be inserted.

If the user device updates the estimated insertion point 304 to the end of the segment stored in the buffer slot 336 and the beginning of the segment stored in the buffer slot 338, the user device may further replace the Channel A segment stored in the buffer slot 336 with an additional slate segment.

In the example of FIG. 3C, the deviation between the actual manifest downloading time and the average manifest downloading time included in the historical data does not impact the estimated insertion point 304. So, in FIG. 3C, the estimated insertion point 304 remains the same as in FIG. 3B.

The actual downloading of the Channel B content may take longer than expected, e.g., storing the decoded first Channel B segment in the playback buffer (which will be described in detail below) may require more time, such that the first Channel B segment may be not ready for rendering when the playback progress 302 reaches the estimated insertion point 304. In such an example, the Channel A segment stored in the buffer slot 336 may be displayed to the user during the channel change, and display of the Channel A content may cause the user to wonder whether the channel change has been properly processed or whether the user has selected an unwanted channel. To avoid this, the user device may replace the Channel A segment stored in the buffer slot 336 with an additional slate segment, such that the user device may continue to render content of the additional slate segment to show that the channel change is being processed. As the playback progresses, until the first segment of Channel B is ready to be inserted in the playback buffer (as will be described below in FIG. 3D), the user device may continue to append additional slate segments to the last inserted slate segment in order to keep the playback continuing with slate segments.

During the channel change, the user device may have only the slate segments stored in the playback buffer until the content of Channel B is actually inserted in the playback buffer and is ready for the user device to playback. So, the user device may remove all unwanted service content (e.g., the Channel A segment previously stored in the buffer slot 336) from the playback buffer so the user will only see the slate content during the channel change.

The estimated insertion point 304 may be inside of a segment. Based on the historical data and/or the ABR calculations, the user device may determine that the estimated insertion point 304 points to an intermediate portion of a buffer slot. The user device may choose, from slate segments having different content lengths, proper slate segment(s) to replace the Channel A content disposed between the end of the currently-rendered Channel A segment and the estimated insertion point 304. For example, the user device may determine that the estimated insertion point 304 points to the end of the first half of the Channel A segment stored in the buffer slot 332. The first half of Channel A segment stored in the buffer slot 332 has one (1) second length of the Channel A content. The user device may replace the first half of the Channel A segment with a 1-second slate segment. In some cases, the user device may use the slate segment(s) including only a single I-Frame of black or blank screen to replace the Channel A content. For example, the estimated insertion point 304 may point to the end of an I-Frame included in a Channel A segment. In addition to or as an alternative to replacing the Channel A content with slate segments having bigger content sizes, the user device may use the slate segment(s) including only a single I-Frame of black or blank screen to replace one or more I-Frames of the Channel A content disposed between the end of the currently-rendered Channel A segment and the estimated insertion point 304.

Figure 3D:
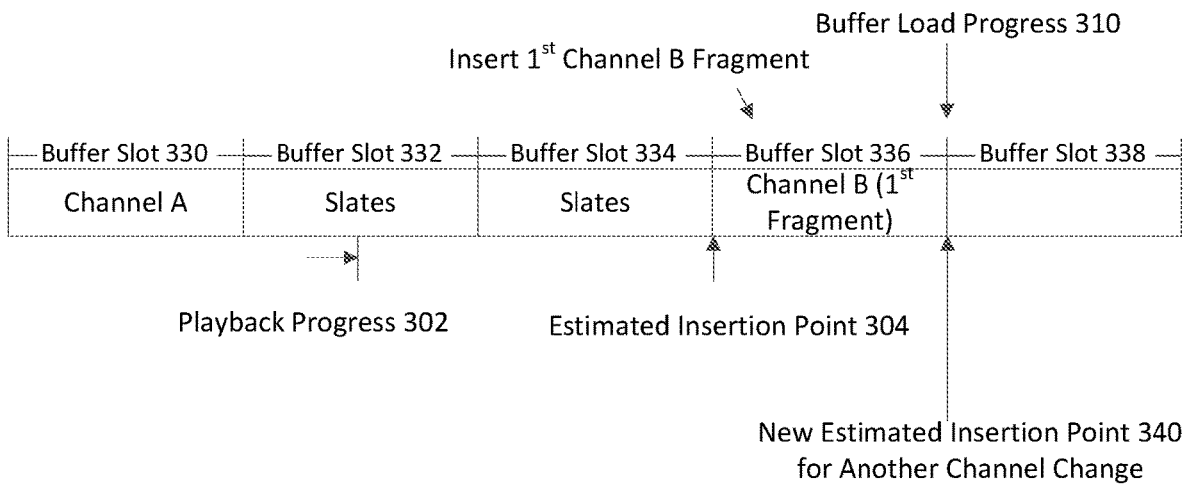

As shown in FIG. 3D, the user device starts downloading the first video segment indicated in the downloaded manifest of Channel B. The user device may download the first segment of Channel B (e.g., the Channel B segment stored in the buffer slot 336) based on its address listed in the manifest. The user device may insert the downloaded first segment of Channel B in the playback buffer by replacing the slate segment stored in the buffer slot 336 with the first segment of Channel B. As discussed above, the user device may insert the first segment of Channel B after the estimated insertion point 304.

Before the first segment of Channel B is downloaded, the user device may determine to download the first segment of Channel B having the last calculated resolution/quality (e.g., a resolution/quality calculated for an additional Channel A segment to be downloaded after the Channel A segment stored in the buffer slot 336 is downloaded, if no service change command is received, FIG. 3A), such that the user may experience consistent video quality when changing to a new service. Alternatively, the user device may determine to download the first segment of Channel B having the lowest resolution/quality, among all available resolutions/qualities.

As such, the time for the user device to download the first encoded segment of Channel B would be reduced and thus the tune time may be further reduced.

The time for the user device to download and insert the first segment of Channel B may be a sum of the time for the user device to download the first encoded segment of Channel B based on its address listed in the manifest, the time for the user device to get a new DRM license if needed, the time for the user device to initialize a new video/audio codec if needed, the time for the user device to decrypt the first segment of Channel B, and the time for the user device to insert the decrypted first segment of Channel B. For example, it may take 1.5 second for the user device to complete downloading and inserting the first segment of Channel B in the playback buffer. Details will be described below.

The encoded first segment of Channel B may be stored in a remote server. The manifest may list the address of the encoded first segment of Channel B in the remote server. The user device may download/retrieve the encoded first segment of Channel B from the remote server based on its address. It may take some time for the user device to download/retrieve the encoded first Channel B segment from the remote server.

As discussed above, the manifest of Channel B may include information indicating the video/audio codec for decrypting the encoded content of Channel B. The video/audio codec for decrypting the encoded content of Channel B may be different from the video/audio codec for decrypting the encoded content of Channel A. If a different codec is needed, the user device may need to initialize the new video/audio codec to decrypt the encoded content of the Channel B. It may take some time for the user device to initialize the new video/audio codec. In addition to or as an alternative to initializing a new video/audio codec, there are some other cases that the need of a new video/audio codec may impact the time of downloading and inserting the first segment of Channel B. For example, if a new video/audio codec is needed, the file size of the segment may become larger, e.g., due to poorer compression algorithms of the old codec, than previously used in the ABR calculations, and thus downloading the segment may require longer time due to the larger file size. As another example, if a new video/audio codec is needed, the playback buffer may need to be initialized. It may take some time to initialize the playback buffer. In this example, the initialized playback buffer may be filled with slate segments from the starting point of the initialized playback buffer and the user device may insert the first segment of the Channel B from the estimated insertion point of the playback buffer to expedite playback of content of Channel B.

If Channel B has a different DRM compared to Channel A, the user device may need to obtain, based on the information in the manifest, a new DRM license to access the content of Channel B. It may take some time for the user device to obtain the new DRM license associated with Channel B. If Channel B has the same DRM compared to Channel A, the user device may determine that there is no need to obtain a new DRM license.

The user device may need some time to decrypt the encoded first segment of Channel B.

The user device may insert the decrypted first segment of Channel B at the estimated insertion point 304. The insertion of the decrypted first segment of Channel B may take a very short time.

In the example discussed above, the total time for the user device to download and insert the first segment of Channel B is 1.5 seconds.

In the example of FIG. 3D, based on the time taken to download and insert the first segment of Channel B, the user device may determine whether the downloading and inserting the first segment of Channel B impacts where in the playback buffer insertion of the content of Channel B should begin. For example, the user device may compare the time for downloading and inserting the first segment of Channel B with the average first new service segment downloading and inserting time (e.g., the average time for the user device to previously download and insert the first segment indicated in the new service manifests during previous channel changes) indicated by the historical data. The user device may determine the estimated insertion point needs to be updated if the deviation between the time for downloading and inserting the first segment of Channel B and the average first new service segment downloading and inserting time impacts the estimated insertion point. For example, if the downloading and inserting the first segment of Channel B takes two (2) seconds longer than the average first new service segment downloading and inserting time, the user device may update the estimated insertion point 304 by moving the estimated insertion point 304 to the end of the segment stored in the buffer slot 336 and the beginning of the segment stored in the buffer slot 338. In this example, the user device may insert additional slate segments prior to the updated estimated insertion point 304 to indicate the service change is in progress before the first segment of Channel B is ready for playback.

The user device may determine, based on the historical data: whether to update the estimated insertion point every time the user device initializes a new video/audio codec, whether to update the estimated insertion point every time the user device obtains a new DRM license, and/or whether to update the estimated insertion point every time the user device decrypts the first segment of Channel B. Details will be discussed below.

The user device may determine that the first segment of Channel B indicated in the manifest is ready to be inserted based on the (updated) estimated insertion point. The user device may insert the first segment of Channel B indicated in the manifest from the (updated) estimated insertion point.

In the example of FIG. 3D, the deviation between the time to download and insert the first segment of Channel B and the average first new service segment downloading and inserting time based on the historical data does not impact the estimated insertion point 304. So, in FIG. 3D, the estimated insertion point 304 remains the same as in FIG. 3C.

As shown in the example of FIG. 3D, as downloading and inserting the first segment of Channel B in the buffer slot 336 takes 1.5 seconds to complete, the user device is now playing back the slate segment stored in the buffer slot 332 as shown by the playback progress 302 which is 1.5 seconds later than where the playback progress 302 points in FIG. 3D.

After the first segment of Channel B indicated in the manifest is inserted in the playback buffer, the user device may continue to read segments stored in the playback buffer one after another, and may start playback of the Channel B segment stored in the buffer slot 336 when the playback progress 302 points to the Channel B segment stored in the buffer slot 336. Alternatively, if the slate segment stored in the buffer slot 334 has not been rendered after the first segment of Channel B has been inserted in the buffer slot 336 (FIG. 3D), the user device may skip playback of content of the slate segment stored in the buffer slot 334 and may force the playback progress 302 to point to the beginning of the first segment of Channel B. As such, the user device may start playback of content of Channel B (starting from the Channel B segment stored in the buffer slot 336) immediately after the playback of the slate segment stored in the buffer slot 332 is complete. The user may start viewing the content of Channel B sooner. The user would not notice that the user device has skipped playback of slate segment(s), specifically slate segments including only black or blank content, so the user's viewing experience would not be negatively impacted. Still alternatively, if the slate segment stored in the buffer slot 334 has not been rendered after the first segment of Channel B is ready for insertion, the user device may update the estimated insertion point 304 to the end of the slate segment stored in the buffer slot 332 and the beginning of the slate segment stored in the buffer slot 334, and insert the first segment of Channel B into the buffer slot 334. Yet alternatively, when the first segment of Channel B is ready for insertion, the user device may identify, in the playback buffer, the first I-frame following the playback progress 302, and may insert the first segment of Channel B by replacing this identified I-frame with the first I-frame of the first segment of Channel B. In this case, the boundaries of buffer slots are not fixed and may be adjusted.

The user device may determine that the service change time for this channel change is four (4) seconds because the time interval between the end of the Channel A segment stored in the buffer slot 330 and the beginning of the Channel B segment stored in the buffer slot 336 is four (4) seconds. The user device may update the historical data based on the service change time for this channel change. Then, based on the updated historical data, the user device may estimate a new estimated insertion point 340 for another new channel change. In this example, as the service change time for this channel change is same as the average service change time, the user device determines that the new estimated insertion point 340 points to four (4) seconds later than the end of the currently-rendered slate segment, stored in the buffer slot 332.

After the first segment of Channel B (e.g., the Channel B segment stored in the buffer slot 336) is inserted in the playback buffer, the user device continues to download and insert other segments indicated in the manifest of Channel B. If the network condition remains unchanged, the downloading of the second segment of Channel B (e.g., the Channel B segment stored in the buffer slot 338) may take time less than time of downloading the first segment because, e.g., the video/audio codec has been updated, and/or as a new DRM license is not required by the second segment.

Figure 3E:
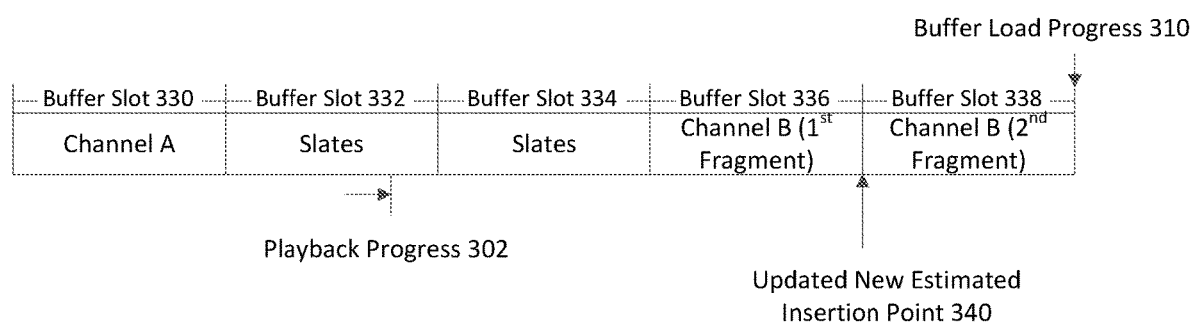

For example, as shown in FIG. 3E, it may take only 0.5 second for the user device to download the second segment of Channel B. The user device may determine to download the second segment of Channel B having the same resolution/quality as the first segment of Channel B. The user device may insert the second segment of Channel B in the buffer slot 338 by appending the second segment of Channel B to the end of the first segment of Chanel B stored in the buffer slot 336. The playback progress 302 may point to 0.5 second later than the playback progress 302 as shown in FIG. 3D. In some cases, if network congestion occurs (e.g., network latency increasing by a predetermined amount, network data transmitting rate falling below a predetermined threshold), it may take longer time to download and store the second segment of Channel B. If the user device has rendered most (e.g., 95%) of the first segment of Channel B and the second segment of the Channel B has not been downloaded and stored, the user device may start appending slate segments (e.g., slate segments including a single I-Frame of black or black screen) to the end of the first segment of Channel B until the second segment of Channel B is ready to insert. As such, the playback buffer does not run out of content for the user device to render, and the user device may continue to render content of the slate segments after rendering of content of the first segment of Channel B is complete. If the second segment of Channel B is ready to insert, the user device may stop inserting slate segments, and may insert the second segment of Channel B immediately after the currently-rendered slate segment. In some cases, the user device may determine, by using the ABR calculations, to use a lower resolution for the third segment of Channel B such that the third segment of Channel B may be downloaded in the playback buffer fast enough to avoid the need of inserting additional slate segments.

After the second Channel B segment is appended to the end of the first Channel B segment, the buffer load progress 310 points to the end of the second Channel B segment stored in the buffer slot 338.

After the playback buffer has stored enough segments of Channel B to satisfy the playback minimum, the user device may download additional subsequent segments of Channel B at a time interval equal to the content length (e.g., 2 second) of a segment of Channel B. The user device may choose a proper resolution/quality for the additional subsequent segment by using the ABR calculations, and may prevent the playback buffer from running out of content in case a network congestion occurs.

The user device may determine whether the new estimated insertion point needs to be updated based on the appending of each new Channel B segment (other than the first segment of Channel B). To make the determination, the user device may record the time of adding each new Channel B segment and update data associated with the new segment appending time or the average new segment appending time included in the historical data. The time of adding a new Channel B segment may depend on the network condition. When the network condition becomes worse (e.g., network congestion), the time for adding a new Channel B segment may become longer. For example, if it takes two (2) seconds more than the average new segment appending time for the user device to append the second segment of Channel B, the user device may determine that a significant network congestion occurs, and the user device may update the new estimated insertion point 340 by moving the new estimated insertion point 340 to the end of the second Channel B segment stored in the buffer slot 338.

In the example of FIG. 3E, it is assumed that the user device determines that the network condition does not impact where in the playback buffer content of a new channel should start to be inserted if the user device receives a new channel change command at this time point. Thus, the new estimated insertion point 340 remains the same as in FIG. 3D.

If the user device does not receive any new channel change command, the user device may continue to download and append an additional segment indicated in the manifest of Channel B to the last appended segment.

In some cases, during a service change, after parsing a manifest of the new service (e.g., Channel B), the user device may determine and identify a plurality of Channel B segments (e.g., the first three Channel B segments), indicated in the manifest of the Channel B, that may satisfy the playback minimum. The user device may simultaneously attempt three content segment requests, e.g., HyperText Transfer Protocol (HTTP) requests, to simultaneously retrieve and download the first three Channel B segments. Because these content requests are attempted without ABR calculations and the user device requires the first three Channel B segments be downloaded as fast as possible to expedite the playback of content of Channel B, the user device may retrieve and download the first three Channel B segments with a resolution/quality lower than the best/highest available resolution/quality. After the first three Channel B segments listed in the manifest of Channel B are downloaded in the playback buffer and the playback minimum is satisfied, the user device may use the ABR calculations to determine and/or adjust the resolution/quality of an additional Channel B segment (e.g., the fourth segment of Channel B indicated in the manifest of Channel B). For example, if the ABR calculations determine that the fourth Channel B segment may be downloaded with a resolution/quality higher than the resolution/quality of the first three Channel B segments, the user device may download the fourth Channel B segment with a higher resolution/quality. If a new DMR license is required for Channel B, the user device may request the new DRM license in parallel with the retrieval and downloading of the Channel B segments.

Without re-initializing the playback buffer, the user device may retain the ABR data resulted from previous ABR calculations, and may download content of Channel B with the resolution/quality (e.g., the best/highest available resolution/quality) same as the resolution/quality of the old channel (e.g., Channel A).

As shown in the examples of FIGS. 3A-3E, the user device may change from Channel A to Channel B without re-initializing the playback buffer and re-filling the re-initiated playback buffer.

In the case of initialization of the user device (e.g., the user device being powered on), the user device may auto-tune (e.g., tuning to the last tuned channel). The tuning may comprise selecting a content stream (e.g., an IP stream, an MPEG transport stream, etc.). An example of auto-tune will be described below.

At the time the user device is powered on, for simplicity, it is assumed that the playback progress points to the very beginning of the playback buffer, and the playback buffer has been initialized and does not store any content. As discussed above, an initialized playback buffer may require a minimum amount of content (e.g., the playback minimum including 6 seconds of content or three 2-second video segments) in order to allow the user device to start rendering content that is stored in the playback buffer.

After the user device is powered on, the user device may pre-load some slate segments in the playback buffer from the very beginning of the playback buffer. The number of pre-loaded slate segments may be equal to the playback buffer minimum associated with the playback buffer. The user device may pre-load three (3) 2-second slate segments from the very beginning of the playback buffer. As the pre-loading of the slate segments does not take significant time, the user device may start playback of the slate segments right after the user device is powered on. Then, similarly to the channel change discussed above, the user device may download the manifest of the last tuned channel, and download and insert the segments indicated in the manifest from the estimated insertion point. The user device may perform pre-loading the slate segments and downloading the manifest in parallel.

The estimated insertion point for inserting the last-tuned channel content may be determined based on the historical data.

The historical data may comprise data associated with the auto-tune time that may be a time interval between a time point at which the user device is powered on and a time point at which the user device starts playback of the content of the last tuned channel. The user device may determine that the estimated insertion point points to the average auto-tune time later than the beginning of the playback buffer. For example, if the average channel change time is three (3) seconds, the user device may determine that the estimated insertion point points to three (3) seconds later than the beginning of the playback buffer. As such, after the user device is powered on, the content of the last tuned channel is predicted to be inserted at three (3) seconds from the beginning of the playback buffer.

In some cases, to simplify determination of the estimated insertion point, the user device may determine the estimated insertion point for the auto-tune based solely on the slate segment that is being rendered. For example, the user device may determine the slate segment that is being rendered, and determine that the end of the currently-rendered slate segment is the estimated insertion point.

Figure 4A:
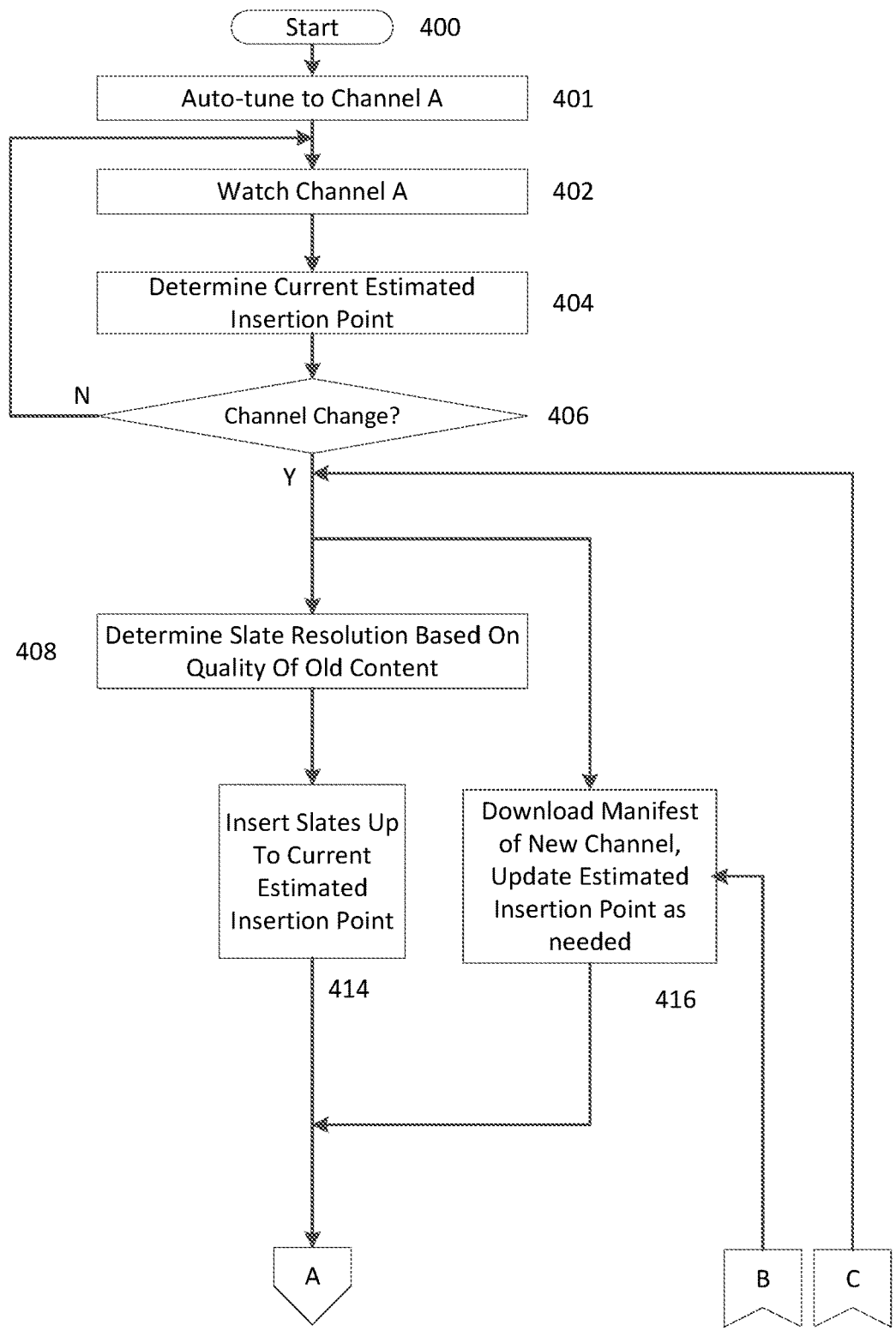
FIGS. 4A and 4B are a flow chart showing an example method for controlling a playback buffer.
Figure 4B:
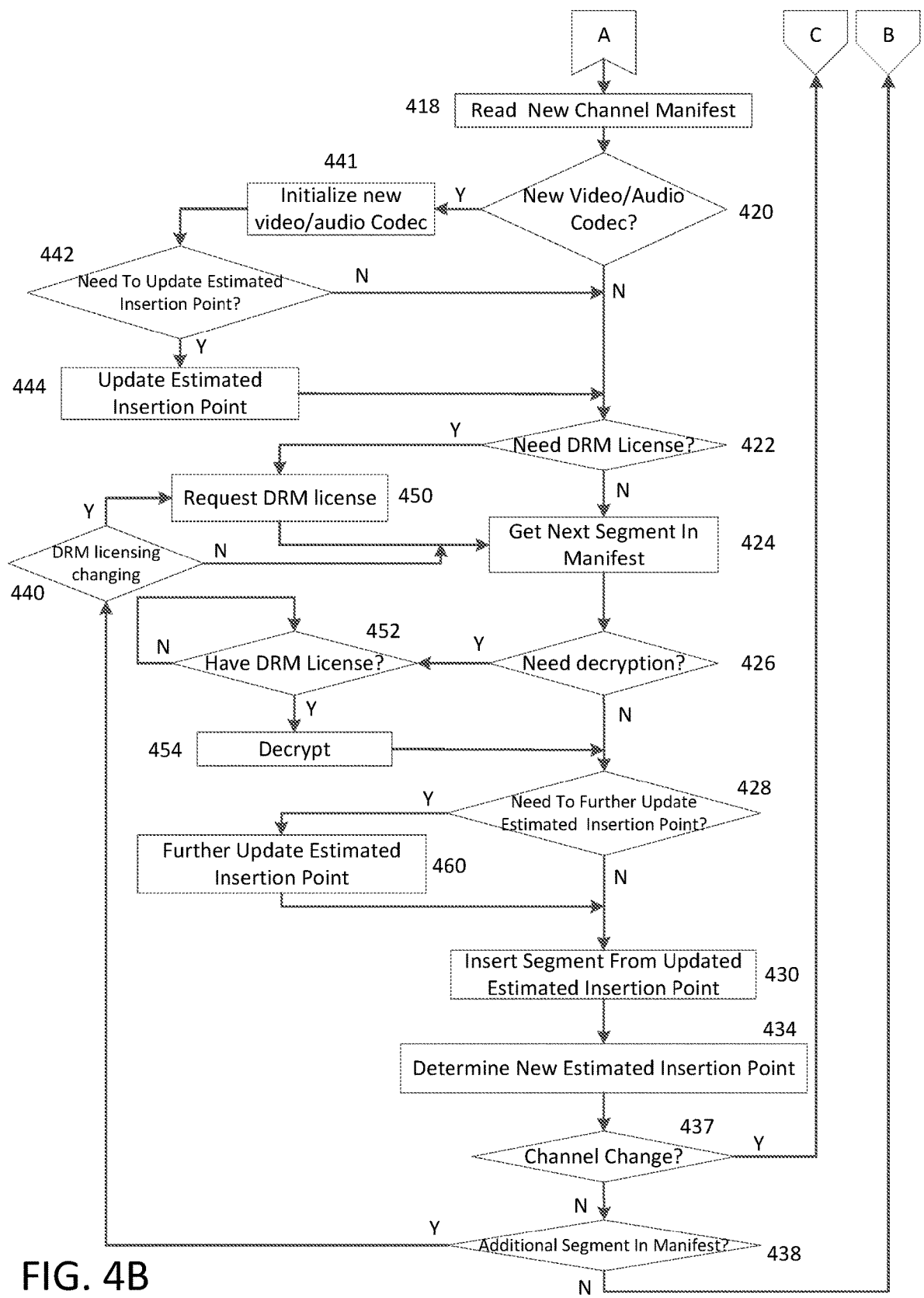

FIGS. 4A and 4B are a flow chart showing an example method controlling the playback buffer during a service change. The Example method of FIGS. 4A and 4B may be performed by a user device or by another type of consuming device.

At step 400, the user device is powered on. For simplicity, at step 400, the playback progress pointed to the very beginning of the playback buffer, and the playback buffer has been initialized and does not store any content.

At step 401, the user device may auto-tune to the last tuned channel (e.g., Channel A). As discussed above, the user device may pre-load some slate segments in the playback buffer from the very beginning of the playback buffer. The number of pre-loaded slate segments may be equal to the playback minimum associated with the playback buffer. As the playback minimum is satisfied with the pre-loaded slate segments, the user device may start playback of the slate segments very soon after (e.g., less than 0.01 second after) the user device is powered on. The user device may download the manifest of Channel A, and download and insert the segments indicated in the manifest from an estimated insertion point. As discussed above, the user device may determine the estimated insertion point (for inserting the content of Channel A) based on history data.

The process may proceed to step 402 where the user device presents the content of Channel A. At step 404, the user device, or an associated device, may determine an estimated insertion point (e.g., the estimated insertion point 304 as shown in FIG. 3A) based on historical data indicating the average service change time spent on previous service changes. As discussed above, the estimated insertion point may predict, if the user device receives a service change command (e.g., a channel change command for changing Channel A to a new channel, for example, Channel B) at this moment, where in the playback buffer the content of Channel B should start to be inserted. Playback can continue using the playback buffer, and can smoothly transition from the segment change content to the Channel B content.

The playback buffer of the user device at steps 402 and 404 may be similar to the playback buffer as shown in FIG. 3A.

At step 406, the user device may determine whether it receives a service change command (e.g., channel change, request to stream on demand content, etc.). The user device may receive a channel change command by, e.g., receiving a signal from a remote control device communicating with the user device. That signal may indicate a user's input indicating a channel change command.

If the user device does not receive a channel change command, the method returns to step 402 where the user device continues to consume the content of Channel A.

If the user device receives a service change command, the method proceeds to step 408 from step 406, and the playback buffer of the user device may be similar to the playback buffer as shown in FIG. 3B.

As previously discussed in connection with FIG. 3C, the user device may insert slates immediately after the currently-rendered video segment. At step 408, the user device may determine a slate resolution (e.g., a resolution/quality of a slate segment) for the slate segments that are to be inserted immediately after the video segment being rendered and prior to the estimated insertion point. The user device may select, for insertion, slate segments having the resolution/quality that is substantially same as the resolution/quality of the currently rendered service (e.g., Channel A). At step 414, the user device may insert the slate segments up to the estimated insertion point. After step 414 is completed, an example of the playback buffer may be the playback buffer as shown in FIG. 3C.

Still as previously discussed in connection with FIG. 3C, in parallel to the step 414, the user device may download the manifest of Channel B at step 416. At step 416, the user device may also update, as needed, the estimated insertion point based on the manifest downloading. For example, the user device may compare the time for downloading the manifest of Channel B with the average manifest downloading time (e.g., the average time for the user device to previously download new channel manifests during previous channel changes) indicated by the historical data. The user device may determine the estimated insertion point needs to be updated if the deviation between the time for downloading the manifest of Channel B and the average manifest downloading time impacts the estimated insertion point. For example, if the downloading of the manifest of Channel B takes two (2) seconds longer than the average manifest downloading time, the user device may update the estimated insertion point by moving the estimated insertion point to 2 seconds later.

The method may proceed to step 418 (FIG. 4B). At step 418, the user device may read the downloaded manifest of Channel B to download segments of Channel B listed in the downloaded manifest of Channel B. As discussed previously, before the user device has downloaded and stored enough segments of Channel B in the playback buffer to satisfy the playback minimum, the user device may determine to download segments of Channel B having resolutions/qualities same as the resolution/quality of the last calculated resolution/quality (calculated for an additional Channel A segment after the Channel A segment stored in the buffer slot 336 is complete, if no service change command is received, FIG. 3A); or alternatively, the user device may download segments of Channel B having the lowest resolutions/qualities, among all available resolutions/qualities. The playback buffer has stored enough segments of Channel B to satisfy the playback minimum. The user device may determine proper resolutions/qualities for additional subsequent segments by using the ABR calculations, and may download each of the additional subsequent segments of Channel B at a time interval equal to the content length (e.g., 2 second) of a segment of Channel B.

At step 420, based on the information of video/audio codec included in the manifest, the user device may determine whether the video/audio codec for decrypting the encoded content of Channel B is different from the video/audio codec for decrypting the encoded content of Channel A.

If the video/audio codec for decrypting the encoded content of Channel B is different from the video/audio codec for decrypting the encoded content of Channel A, the method may proceed to step 441 where the user device may initialize the new video/audio codec.

If the video/audio codec for decrypting the encoded content of Channel B is same as the video/audio codec for decrypting the encoded content of Channel A, the method may proceed to step 422 (which will be discussed below).

As previously discussed, it may take some time for the user device to initialize the new video/audio codec. At step 442, as previously discussed in connection with FIG. 3D, the user device may determine, based on the historical data, whether the time for initializing the new video/audio codec may impact where in the playback buffer the content of Channel B should start to be inserted. The user device may compare the time taken to initialize the new video/audio codec with the average video/audio codec initializing time (e.g., the average time for the previous initialization of video/audio codecs) included in the historical data, and determine whether to update the estimated insertion point based on the comparison. The user device may determine that the estimated insertion point needs to be updated if the deviation between the time taken to initialize the new video/audio codec and the average video/audio codec initializing time included in the historical data impacts the estimated insertion point. For example, the historical data may include the initializing times associated with the last 20 initializations of new video/audio codec. The user device may calculate the average video/audio codec initializing time based on the historical data, and compare the actual time taken to initialize the new video/audio codec and the average video/audio codec initializing time. If the deviation is more than 5%, the user device may determine that the estimated insertion point needs to be updated. If the user device determines to update the estimated insertion point, the method may proceed to step 444. At step 444, the user device may update the estimated insertion point. For example, if it takes two (2) seconds more than the average video/audio codec initializing time for the user device to initialize the new video/audio codec, the user device may move the estimated insertion point two (2) seconds later.

If the user device determines not to update the estimated insertion point, the method may proceed to step 422.

At step 422, the user device may determine whether to obtain a new DRM license for accessing the content of Channel B.

As previously discussed in connection with FIG. 3D, Channel B has a different DRM compared to Channel A, the user device may need to obtain, based on the information in the manifest, a new DRM license to access the content of Channel B. If Channel B has a same DRM compared to Channel A, the user device may need not to obtain a new DRM license to access the content of Channel B.

Different segments of Channel B may or may not have different DRMs. Before downloading and decrypting each segment of Channel B, the user device may determine whether a new DRM license is required based on the DRM information included in the manifest and obtain the new DRM as needed.

If the user device determines not to obtain a new DRM license, the method may proceed to step 424. At step 424, the user device may download a segment of Channel B indicated in the manifest. For example, the user device may first download the first segment of Channel B indicated in the manifest, and then download the subsequent segments indicated in the manifest in sequence.

If the user device determines to obtain a new DRM license, the method may proceed to step 450. At step 450, the user device may request a new DRM license. The method may then proceed to step 424 where the user device may download the segment of Channel B indicated in the manifest.

The method may then proceed to step 426. At step 426, the user device may determine whether the downloaded segment needs to be decrypted before being displayed on a display screen of the user device.

If the user device determines that the segment needs to be decrypted, the method may proceed to step 452 where the user device determines whether the user device has obtained a new DRM license. If the user device has not obtained the new DRM license, the user device may wait until the user device obtains a new DRM license.

If the user device has obtained the new DRM license, the method may proceed to step 454. At step 454, the user device may decrypt the segment indicated in the manifest of Channel B. The method then proceeds to step 428 where the user device may determine if the estimated insertion point needs to be updated. If the user device determines at step 426 that the segment does not need to be decrypted, the method may proceed to step 428 from step 426.

As previously discussed in connection with FIG. 3D, at step 428, the user device may determine, based on the obtaining the new DRM license and/or decrypting the segment of Channel B, if the estimated insertion point needs to be updated. The user device may compare the time taken to obtain the new DRM license with the average new DRM licensing obtaining time (e.g., the average time for previously obtaining new DRM licensing) included in the historical data. The user device may determine that the estimated insertion point needs to be updated if the deviation between the time taken to obtain the new DRM license and the average new DRM licensing obtaining time included in the historical data impacts the estimated insertion point. The user device may compare the time taken to decrypt the segment with the average segment decrypting time (e.g., the average time for previously decrypting segments) included in the historical data. The user device may determine that the estimated insertion point needs to be updated if the deviation between the time taken to decrypt the segment and the average segment decrypting time impacts the estimated insertion point.

If the user device determines that the estimated insertion point needs to be updated, the method proceeds to step 460 where the user device updates the estimated insertion point. For example, if it takes two (2) seconds more than the average new DRM licensing obtaining time for the user device to obtain the new DRM license, the user device may move the estimated insertion point two (2) seconds later. If it takes one (1) second less than the average new DRM licensing obtaining time for the user device to obtain the new DRM license, the user device may move the estimated insertion point one (1) second earlier. As another example, if it takes two (2) seconds more than the average segment decrypting time for the user device to decrypt the segment, the user device may move the estimated insertion point two (2) seconds later. If it takes one (1) second less than the average segment decrypting time for the user device to decrypt the segment, the user device may move the estimated insertion point one (1) second earlier.

If the user device determines at step 428 that the estimated insertion point does not need to be updated, the method proceeds to step 430. At step 430, the user device may insert the decrypted segment indicated in the manifest of Channel B from the (updated) estimated insertion point.

At step 434, the user device may determine a new estimated insertion point for another new channel change. The determination of the new estimated insertion point is similar to the determination in step 404.

If the inserted segment is the first segment of Channel B inserted in the playback buffer, the playback buffer at steps 420-436, 442, 444, 450-454, and 460 may be similar to the playback buffer as shown in FIG. 3D.

The method may proceed to step 437. At step 437, the user device may determine if the user device receives a service change command (e.g., e.g., channel change, request to stream on demand content, etc.). This step is similar to step 406. If the user device determines a service change command has been received, the method returns to step 408 and performs another channel change.

If it is determined that the user device has not received a service change command, the method proceeds to step 438. At step 438, the user device may determine if there is an additional segment indicated in the manifest.

If there is an additional segment indicated in the manifest, the method proceeds to step 440. At step 440, the user device may determine whether the user device needs to obtain a new DRM license for the additional segment. If a new DRM license needs to be obtained for the additional segment, the method may return to step 450 where the user device requests a new DRM license. If a new DRM license does not need to be obtained, the user device may download the additional segment (step 424).

If there is no additional segment, the method returns from step 438 to step 416. At step 416, the user device may download an updated manifest of Channel B so that the user device may download more Channel B content.

If the inserted additional segment is the second segment of Channel B inserted in the playback buffer, the playback buffer at steps 438, 440, 450, and 424 may be similar to the playback buffer as shown in FIG. 3E.

While the user device continues to consume the content of Channel B, the user device may continue to append new segments of Channel B to the last inserted segments of Channel B.

The order of steps in the flow chart of FIGS. 4A and 4B may vary. For example, step 422 may be performed before step 420. As another example, step 437, where the user device determines if the user device receives a channel change command, may be performed periodically (e.g., every 0.1 second) throughout the playback of the service content. The user device may perform step 437 in parallel to, prior to, or following any step shown in FIG. 4B.

One or more steps may be modified or omitted, and/or other steps added. In addition, or as an alternative to the video/audio player application controlling the DRM of the service content, a separate DRM system-on-chip (SOC) may determine if a new DRM license is needed and obtain the DRM license as needed. In connection with the video/audio player application downloading a segment indicated in the manifest, the DRM SOC may determine whether the user device needs a new DRM license to access the segment. If the user device needs a new DRM license to access the segment, the DRM SOC may obtain a new DRM license and send data indicating the new DRM license to the video/audio player application. Based on the video/audio player application receiving the data indicating the new DRM license from the DRM SOC, the video/audio player application may, as discussed above, determine whether the getting DRM license impacts the estimated insertion point and update the estimated insertion point as needed. The video/audio player application may still control the playback buffer as previously discussed, with DRM SOC controlling the DRM license.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   storing, by a computing device and in a playback buffer, content from a current service;
   determining an estimated new service insertion point in the playback buffer, wherein the estimated new service insertion point is based on an estimated amount of time needed for obtaining content of a new service;
   receiving a service change request to change from the current service to a new requested service;
   replacing, in the playback buffer and prior to the estimated new service insertion point, a portion of the stored content from the current service with service change content;
   replacing, in the playback buffer and after the estimated new service insertion point, a portion of the stored content from the current service with content from the new requested service;
   beginning outputting of the service change content from the playback buffer; and
   based on a determination that the replacing of the portion of the stored content with the content from the new requested service occurs before completion of the outputting of the service change content, skipping outputting of a remainder of the service change content in the playback buffer.

2. The method of claim 1, wherein the current service comprises one or more of a first streaming service or a first channel and the new requested service comprises one or more of a second streaming service or a second channel.

3. The method of claim 1, wherein the estimated new service insertion point is also based on determining that one or more of a new audio codec or a new video codec is needed.

4. The method of claim 1, wherein the replacing the portion of the stored content from the current service with the service change content comprises replacing one or more segments of the stored content from the current service with one or more blank slate segments.

5. The method of claim 1, wherein the determining the estimated new service insertion point is also based on determining that the new requested service is encrypted.

6. The method of claim 1, wherein the estimated amount of time needed for obtaining the content of the new service is based on determining a time interval between a time associated with a prior service change request and a time at which the computing device started playback of a prior new service.

7. The method of claim 1, further comprising:
   determining a resolution of the service change content to match a resolution of the content of the current service.

8. The method of claim 1, wherein the estimated amount of time needed for obtaining content of a new service is based on a time interval between a time at which the computing device was previously powered on and a time at which the computing device started playback of content of a previous service associated with an auto-tune associated with power on of the computing device.

9. The method of claim 1, wherein the estimated new service insertion point is further based on determining one or more of:
   a current time of day;
   a resolution associated the current service; or
   network conditions.

10. The method of claim 1, wherein the estimated amount of time needed for obtaining content of a new service is based on an estimated amount of time between when a new service request is received and when a first segment of the new service is acquired.

11. The method of claim 1, further comprising generating the service change content, wherein the service change content is different from content from the new requested service.

12. A method comprising:
    determining, based on an amount of time associated with previous service change requests, a buffer location, in a playback buffer associated with a computing device, for managing content in the playback buffer based on a service change; and
    after receiving a service change request to change from a current service to a new service, overwriting a portion of content of the current service in the playback buffer before the buffer location with service change content and overwriting a different portion of the content of the current service in the playback buffer after the buffer location with content of the new service, without overwriting the different portion of the content of the current service with the service change content.

13. The method of claim 12, wherein the current service comprises one or more of a first streaming service or a first channel and the new service comprises one or more of a second streaming service or a second channel.

14. The method of claim 12, wherein the portion of the content of the current service is a portion prior to the buffer location and immediately following a content segment, of the current service, that was being output by the computing device when the service change request was received.

15. The method of claim 12, wherein the determining the buffer location is further based on an amount of time needed to decrypt the content of the new service.

16. The method of claim 12, wherein the service change content is received via a different service than the new requested service.

17. An apparatus comprising:
    one or more processors; and
    memory storing instructions that, when executed by the one or more processors, configure the apparatus to:
       determine, based on an amount of time associated with previous service change requests, a buffer location, in a playback buffer associated with a computing device, for managing content in the playback buffer based on a service change; and after receiving a service change request to change from a current service to a new service, overwrite a portion of content of the current service in the playback buffer before the buffer location with service change content and overwrite a different portion of the content of the current service in the playback buffer after the buffer location with content of the new service, without overwriting the different portion of the content of the current service with the service change content.

18. The apparatus of claim 17, wherein the current service comprises one or more of a first streaming service or a first channel and the new service comprises one or more of a second streaming service or a second channel.

19. The apparatus of claim 17, wherein the portion of the content of the current service is a portion prior to the buffer location and immediately following a content segment, of the current service, that was being output by the computing device when the service change request was received.

20. The apparatus of claim 17, wherein the instructions, when executed by the one or more processors, configure the apparatus to determine the buffer location further based on an amount of time needed to decrypt the content of the new service.

21. The apparatus of claim 17, wherein the service change content is received via a different service than the new requested service.

22. An apparatus comprising:
one or more processors; and
memory storing instructions that, when executed by the one or more processors, configure the apparatus to:

store, by a computing device and in a playback buffer, content from a current service;

determine an estimated new service insertion point in the playback buffer, wherein the estimated new service insertion point is based on an estimated amount of time needed for obtaining content of a new service;

receive a service change request to change from the current service to a new requested service;

replace, in the playback buffer and prior to the estimated new service insertion point, a portion of the stored content from the current service with service change content;

replace, in the playback buffer and after the estimated new service insertion point, a portion of the stored content from the current service with content from the new requested service;

begin outputting of the service change content from the playback buffer; and based on a determination that the replacing of the portion of the stored content with the content from the new requested service occurs before completion of the outputting of the service change content, skip outputting of a remainder of the service change content in the playback buffer.

23. The apparatus of claim 22, wherein the current service comprises one or more of a first streaming service or a first channel and the new requested service comprises one or more of a second streaming service or a second channel.

* * * * *